United States Patent
Uchiyama et al.

(10) Patent No.: US 9,767,377 B2
(45) Date of Patent: Sep. 19, 2017

(54) PATTERN EXTRACTING DEVICE, IMAGE PROJECTING DEVICE, PATTERN EXTRACTING METHOD, AND PROGRAM

(71) Applicants: Yukinaka Uchiyama, Tokyo (JP); Fumihiro Hasegawa, Tokyo (JP)

(72) Inventors: Yukinaka Uchiyama, Tokyo (JP); Fumihiro Hasegawa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 92 days.

(21) Appl. No.: 14/401,897

(22) PCT Filed: May 16, 2013

(86) PCT No.: PCT/JP2013/064297
§ 371 (c)(1),
(2) Date: Nov. 18, 2014

(87) PCT Pub. No.: WO2013/176198
PCT Pub. Date: Nov. 28, 2013

(65) Prior Publication Data
US 2015/0146990 A1    May 28, 2015

(30) Foreign Application Priority Data

| May 21, 2012 | (JP) | 2012-115526 |
| Mar. 7, 2013 | (JP) | 2013-045300 |
| Mar. 15, 2013 | (JP) | 2013-052976 |

(51) Int. Cl.
*G06K 9/46* (2006.01)
*G06K 9/40* (2006.01)
(Continued)

(52) U.S. Cl.
CPC .......... *G06K 9/4609* (2013.01); *G06T 3/0093* (2013.01); *G06T 3/4007* (2013.01);
(Continued)

(58) Field of Classification Search
USPC ............ 382/201, 275; 348/745, 189; 353/69
See application file for complete search history.

(56) References Cited

U.S. PATENT DOCUMENTS

| 6,058,208 A * | 5/2000 | Ikeda | H04N 1/622 358/518 |
| 7,315,660 B2 * | 1/2008 | Valente | H04N 19/895 358/525 |

(Continued)

FOREIGN PATENT DOCUMENTS

| JP | 2001-083949 | 3/2001 |
| JP | 2008-113416 | 5/2008 |

(Continued)

OTHER PUBLICATIONS

Extended European Search Report issued May 5, 2015 in Patent Application No. 13793891.6.

(Continued)

*Primary Examiner* — Kathleen Y Dulaney
(74) *Attorney, Agent, or Firm* — Oblon, McClelland, Maier & Neustadt, L.L.P.

(57) ABSTRACT

A pattern extracting device, an image projecting device, a pattern extracting method, and a program capable of extracting all the feature points by interpolating defective feature points even when there are defective feature points of an image pattern. The pattern extracting device extracts feature points to be interpolated based on a captured image of a projected image pattern, and interpolates the feature point to be interpolated by using near-by feature points that are located near the feature point, divides the near-by feature points into groups, calculates extrapolation coordinates of the groups, and calculates coordinates of the feature point to be interpolated in view of significance of the extrapolation.

20 Claims, 16 Drawing Sheets

ACTUALLY PROJECTED CORRECTION PATTERN

INTERPOLATION USING NEAR-BY FEATURE POINTS

(51) Int. Cl.
  *H04N 3/22* (2006.01)
  *H04N 17/02* (2006.01)
  *G03B 21/14* (2006.01)
  *H04N 9/31* (2006.01)
  *G06T 3/00* (2006.01)
  *G06T 5/00* (2006.01)
  *G06T 3/40* (2006.01)

(52) U.S. Cl.
  CPC .............. *G06T 5/005* (2013.01); *G06T 5/006* (2013.01); *H04N 9/3185* (2013.01); *H04N 9/3194* (2013.01)

(56) References Cited

U.S. PATENT DOCUMENTS

| | | | | |
|---|---|---|---|---|
| 8,565,556 | B2* | 10/2013 | Toda | G06T 3/403 345/660 |
| 2001/0024242 | A1* | 9/2001 | Takeuchi | G06T 3/4023 348/746 |
| 2005/0041217 | A1* | 2/2005 | Tajima | G06T 3/00 353/69 |
| 2008/0002160 | A1* | 1/2008 | Chang | G06T 5/006 353/94 |
| 2008/0036792 | A1* | 2/2008 | Liang | G06T 3/4007 345/660 |
| 2008/0056617 | A1* | 3/2008 | Wei | G06T 3/4007 382/300 |
| 2008/0062164 | A1 | 3/2008 | Bassi et al. | |
| 2008/0136976 | A1* | 6/2008 | Ajito | G03B 21/56 348/745 |
| 2008/0246860 | A1* | 10/2008 | Kusama | G06T 5/005 348/241 |
| 2008/0259170 | A1* | 10/2008 | Hatanaka | H04N 5/23248 348/208.6 |
| 2009/0052800 | A1* | 2/2009 | Aso | G06T 5/006 382/275 |
| 2009/0096887 | A1* | 4/2009 | Tamaoki | G06T 3/4007 348/222.1 |
| 2009/0207185 | A1* | 8/2009 | Furui | H04N 9/3185 345/619 |
| 2010/0014778 | A1* | 1/2010 | Imai | H04N 9/3194 382/275 |
| 2010/0245393 | A1* | 9/2010 | Moriya | G09G 5/391 345/660 |
| 2010/0245684 | A1* | 9/2010 | Xiao | H04N 9/3147 348/745 |
| 2010/0254610 | A1* | 10/2010 | Arimoto | G06T 3/4007 382/199 |
| 2010/0290092 | A1* | 11/2010 | Tabata | H04N 1/401 358/447 |
| 2010/0315601 | A1* | 12/2010 | Furui | H04N 9/3194 353/70 |
| 2011/0022634 | A1* | 1/2011 | Takata | G06F 17/30247 707/776 |
| 2011/0176007 | A1* | 7/2011 | Ding | H04N 9/3182 348/189 |
| 2012/0147205 | A1* | 6/2012 | Lelescu | H04N 13/0029 348/218.1 |
| 2012/0189209 | A1* | 7/2012 | Nakamura | G06T 3/4007 382/199 |
| 2013/0169889 | A1* | 7/2013 | Kubota | G06F 3/04847 348/745 |
| 2013/0202199 | A1* | 8/2013 | Geisler | G06T 3/4007 382/159 |
| 2013/0216139 | A1* | 8/2013 | Nakagawa | G06K 9/4604 382/201 |
| 2013/0242126 | A1* | 9/2013 | Motoda | H04N 5/3572 348/222.1 |
| 2013/0265468 | A1* | 10/2013 | Morimura | H04N 5/23238 348/240.2 |
| 2013/0271798 | A1* | 10/2013 | Nakamura | H04N 1/40 358/463 |
| 2013/0335643 | A1* | 12/2013 | Ishida | H04N 9/3155 348/744 |
| 2014/0010479 | A1* | 1/2014 | Kwon | G06T 3/4007 382/300 |
| 2014/0160169 | A1* | 6/2014 | Ishii | H04N 9/3185 345/672 |

FOREIGN PATENT DOCUMENTS

| | | |
|---|---|---|
| JP | 2010-028411 | 2/2010 |
| JP | 2010-181593 | 8/2010 |
| JP | 2011-50013 | 3/2011 |

OTHER PUBLICATIONS

Wen Wu, et al., "A Prototype of Landmark-Based Car Navigation Using a Full-Windshield Head-Up Display System", Proceedings of the 2009 Workshop on Ambient Media Computing, AMC '09, XP 55186456, (Oct. 23, 2009), pp. 21-27.

International Search Report Issued on Jul. 2, 2013 in PCT/JP2013/064297 filed on May 16, 2013.

Japanese Office Action issued Sep. 27, 2016 for Japanese Patent Application No. 2013-052976.

\* cited by examiner

| STATUS VALUE | STATUS |
| --- | --- |
| 0 | UNCONFIRMED |
| 1 | CONFIRMED |
| 2 | INTERPOLATION |

FIG.8

| STATUS VALUE | STATUS |
|:---:|:---:|
| 0 | UNCONFIRMED |
| 1 | CONFIRMED |
| 2 | INTERPOLATION "A" |
| 3 | INTERPOLATION "B" |

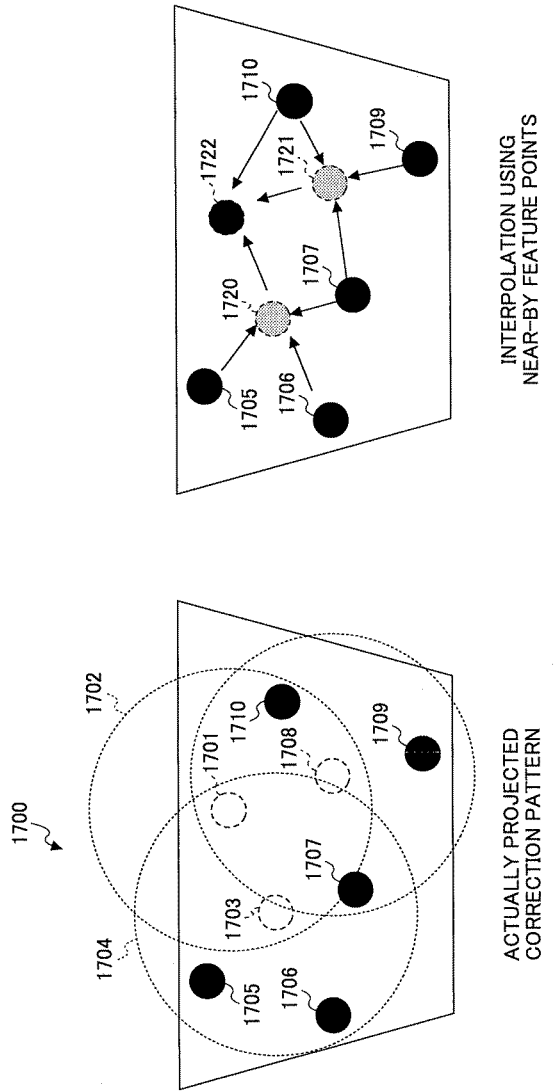

PATTERN EXTRACTING DEVICE, IMAGE PROJECTING DEVICE, PATTERN EXTRACTING METHOD, AND PROGRAM

TECHNICAL FIELD

The present invention relates to a distortion correction of a projected image, and more particularly to a pattern extracting device, an image projecting device, a pattern extracting method, and a program that extract a feature point (characteristic point) included in a projected image pattern.

BACKGROUND ART

Conventionally, when an image is projected by a projecting device such as a projector onto a screen, the projected image may be distorted in a trapezoidal shape (trapezoidal distortion) depending on a relative positional relationship between the projecting device and the screen. Further, a projected image may be non-linearly distorted due to local concavity and convexity or distortion of the screen surface.

To correct such distortion, there has been a known technique in which, an image of a screen, on which an image pattern that includes arranged specific figures is projected, is captured by a digital camera, a distortion level is calculated based on a difference between a position of a feature point extracted from the actually captured image and the corresponding ideal position of the feature point, and the image is corrected by correcting the distortion.

As an example of such a conventional technique, Patent Document 1 discloses an image correction device in which a pattern including feature points arranged at equal intervals (a feature-point pattern) is projected on a screen and captured, a distortion amount due to the projection is calculated by using the coordinates of the feature points included in the captured image, and the projected image is corrected based on the calculated distortion amount.

DISCLOSURE OF THE INVENTION

Problems to be Solved by the Invention

However, in the image correction device disclosed in Patent Document 1, in a case where the image of the feature-point pattern projected on the screen is captured, if environmental conditions are not favorable, a quality of the captured image may be reduced. As a result, it may become difficult to detect all the feature points that should exist in the captured image. For example, in an image whose quality is reduced as shown in FIG. 1, a feature point may be lost (missing or undetectable) which should have exited in the corresponding grid point where grids are crossed. Accordingly, it may become difficult to calculate the distortion amount at the position where the feature point is lost and the image may not be fully corrected.

The present invention is made in light of the above conventional technical problem, and may provide a pattern extracting device, an image projecting device, a pattern extracting method, and a program that may use all the feature points by interpolating the missing feature points even when some of the feature points in the image pattern are missing.

Means for Solving the Problems

In order to solve the above-described problem, a pattern extracting device according to an embodiment of the present invention extracts a feature point to be interpolated based on a captured image of an image pattern, and the feature point to be interpolated is interpolated by using the feature points which are located near the feature point to be interpolated.

Effects of the Present Invention

According to the present invention, by using the above configuration, it may become possible to extract all the feature points by interpolating the missing feature points even when some of the feature points in the image pattern are missing.

BRIEF DESCRIPTION OF THE DRAWINGS

FIG. 8 is a table showing the status values to be used in another embodiment of the present invention;

FIG. 17 is a drawing showing a method of specifying a nearby feature point by setting an upper limit to a distance that corresponds to a near-by area of a reference feature point.

EMBODIMENT TO CARRY OUT THE INVENTION

Figure 1:
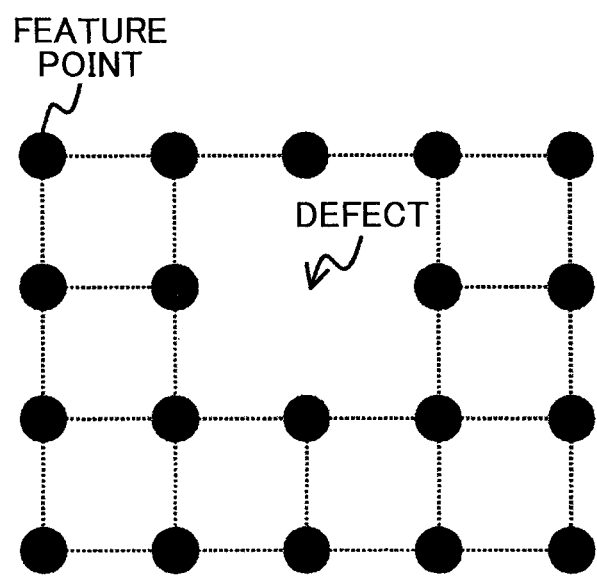
FIG. 1 is a drawing showing a missing node which is a problem in a conventional technique.
Figure 2:
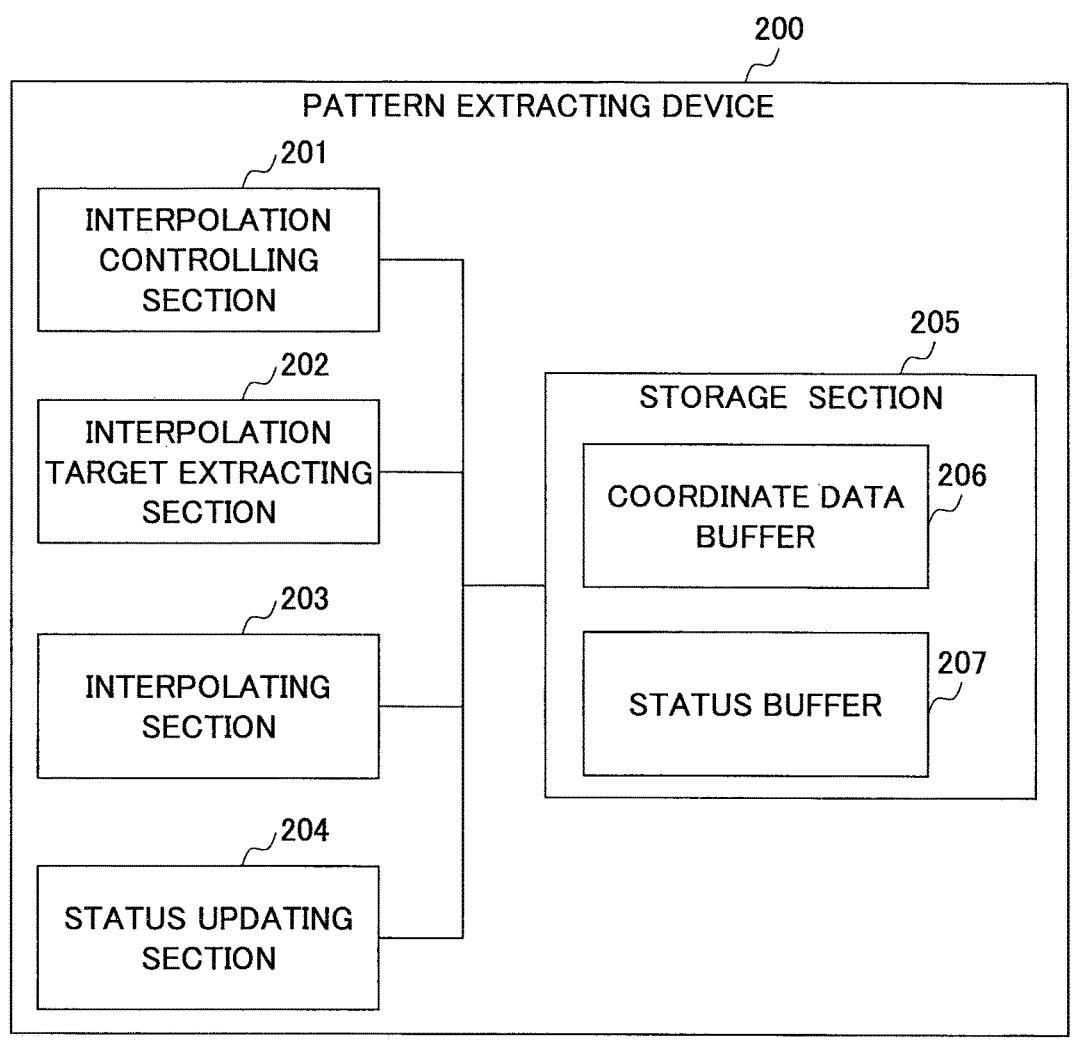
FIG. 2 is a drawing showing a configuration of a pattern extracting device according to an embodiment of the present invention.

The present invention is described with reference to the embodiments described below. However, it should be noted that the present invention is not limited to the embodiments described below. FIG. 2 is a drawing showing a configuration of a pattern extracting device according to an embodiment of the present invention.

A pattern extracting device 200 is a device that interpolates and extracts feature points which are included in a captured image of a correction pattern projected on a screen or the like. In this embodiment, the pattern extracting device 200 may be implemented as a semiconductor device such as an Application Specific Integrated Circuit (ASIC), and may be incorporated into an image projection device such as a projector.

The pattern extracting device 200 uses coordinates of the feature points included in the captured image, interpolates a feature point which is defective in the captured image, and extracts all the feature points. To that end, the pattern extracting device 200 includes an interpolation controlling section 201, an interpolation target extracting section 202, an interpolating section 203, a status updating section 204, and a storage section 205. The functional means included in the pattern extracting device 200 may be realized by using a semiconductor integrated circuit.

The interpolation controlling section 201 is a functional means that controls the interpolation target extracting section 202, the interpolating section 203, the status updating section 204, and the storage section 205, so as to interpolate the feature point in the correction pattern, the feature point being defective in the captured image, and extract all the feature points.

The interpolation target extracting section 202 is a functional means that extracts the feature point to be a target of an interpolation process. The interpolating section 203 is a functional means that interpolates the coordinates of the feature point to be interpolated. The status updating section 204 is a functional means that updates status information indicating a state of the feature point of the correction pattern to be stored in a status buffer 207.

The storage section 205 includes a coordinate data buffer 206 and the status buffer 207. The coordinate data buffer 206 stores the coordinates which are coordinate information of the feature points of the correction pattern acquired from the captured image. The status buffer 207 stores status information of the feature points of the correction pattern acquired from the captured image. Further, the pattern included in a correction pattern described below is not limited to the pattern which is a circular pattern such as a black circle. Namely, the pattern in the correction pattern may be any other patterns (e.g., a figure or image), as long as the pattern, which is located at the coordinates in the original image, may be (successfully) extracted (i.e., as long as the correct position of the pattern in the original pattern is known so as to be compared with the corresponding feature point in an observed data (image data). Such patterns may be images including, for example, a rectangular figure, a figure of a person, and a figure of a natural object such as a mountain.

Figure 3:
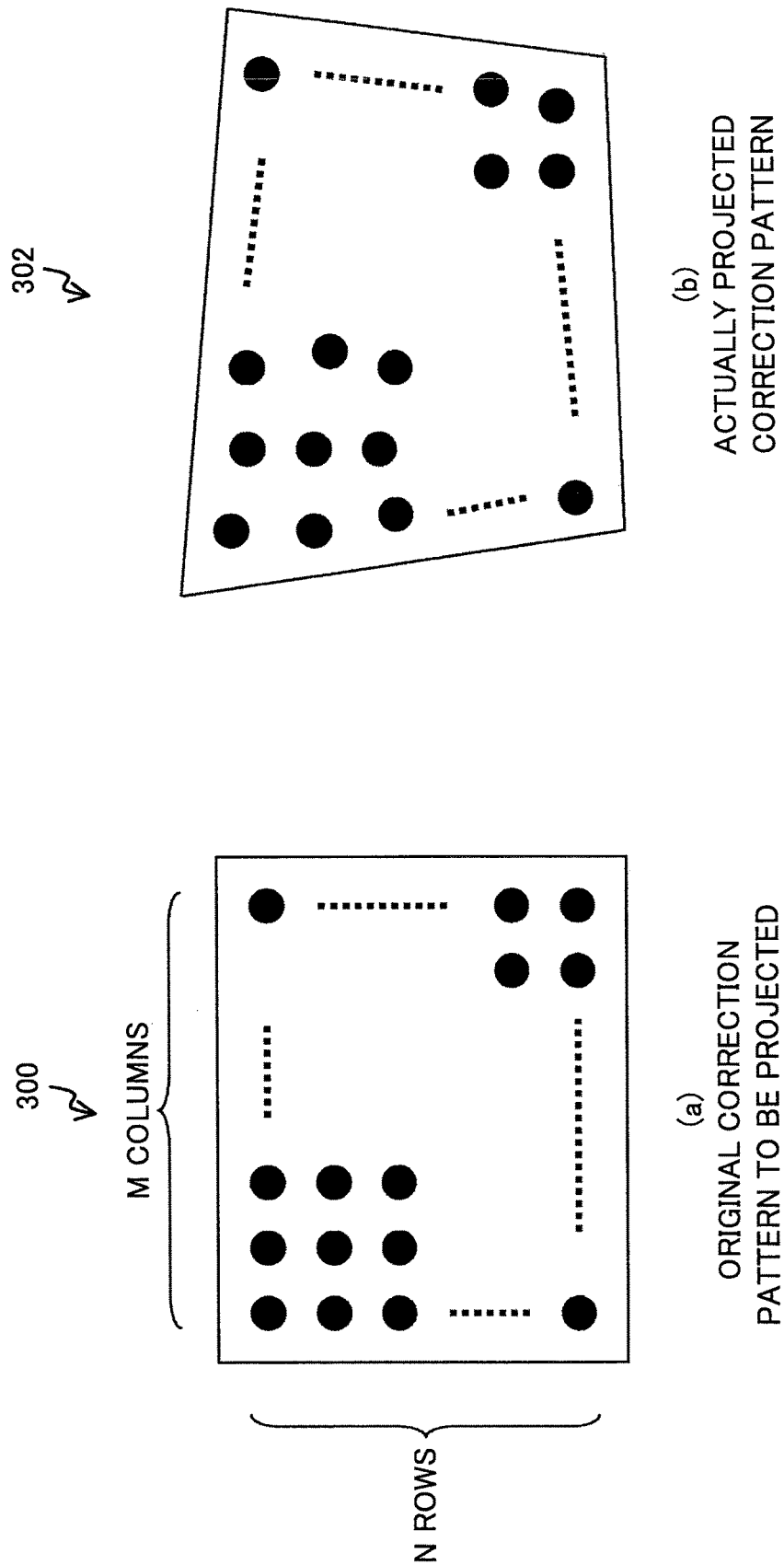
FIG. 3 illustrates a correction pattern according to an embodiment.

FIG. 3 is a drawing showing the correction pattern according to an embodiment. A correction pattern 300 is an image pattern to be projected on a screen by a projector so as to correct a distortion in the projected image. In the correction pattern 300, black circles are arranged with equal intervals on the grids in an M by N matrix.

A correction pattern 302 is an image pattern projected on the screen when the projector projects the correction pattern 300. When compared with the correction pattern 300, the shape of the correction pattern 302 is deformed to have an trapezoidal shape and the positions of the black circles of the correction pattern 302 may be irregularly shifted.

An image capturing device such as a digital camera is used to capture the image of the correction pattern 302 and the black circles, which are the feature points, are extracted from the captured image. By doing this, the coordinates of the feature points are acquired. Further, in the following, the coordinates of the feature point, which is in the captured image and corresponding to the grid point in the "i"th row and "j"th column ($0 \le i \le (M-1)$, $0 \le j \le (N-1)$) of the grid are expressed as $(x[i,j], y[i,j])$. Also, a status value, which is status information of the feature point, is expressed as $S[i,j]$.

Figure 4:
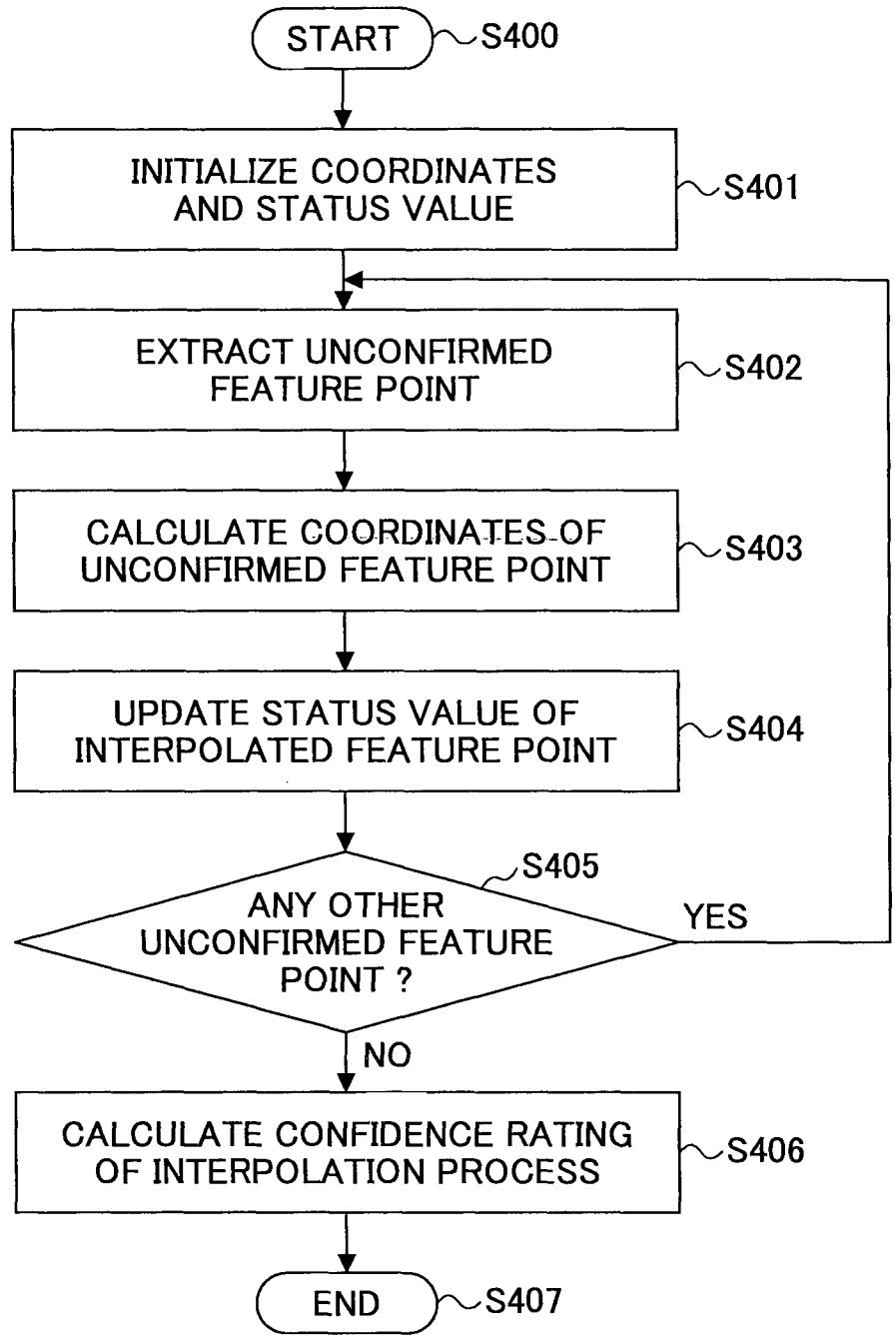
FIG. 4 is a flowchart illustrating a process that is executed by the pattern extracting device according to an embodiment of the present invention.

FIG. 4 is a flowchart showing a process according to an embodiment executed by the pattern extracting device according to an embodiment. In FIG. 4, the process starts in step S400. In step S401, the interpolation controlling section 201 initializes the coordinate data and status value stored in the coordinate data buffer 206 and the status buffer 207, respectively, of the storage section 205.

Specifically, the interpolation controlling section 201 compares the coordinates of the feature points of the correction pattern included in the captured image with the coordinates of the known feature points in the correction pattern, and determines whether the feature points corresponding to the known feature points exist in the captured image. Then, the interpolation controlling section 201 initializes the coordinate and the status value of the feature point differently depending on whether the corresponding feature point exists in the captured image as shown in formula 1.

Case 1: corresponding feature point exists.

$(x[i,j], y[i,j])=(x$ coordinate,$y$ coordinate) of corresponding feature point $S[i,j]=1$ (confirmed)

Case 2: no corresponding feature point exists.

$(x[i,j], y[i,j])=(0,0)$ $S[i,j]=0$ (unconfirmed)  formula 1

When the corresponding feature point exists (i.e., when the feature point of the captured image exists), the coordinates of the feature points of the captured image are set as the known coordinates of the corresponding feature point. On the other hand, when no corresponding feature point exists (i.e., when the feature point of the captured image is defective (missing)), the coordinates of the feature point of the captured data is set to (0,0).

Figures 5, 6:
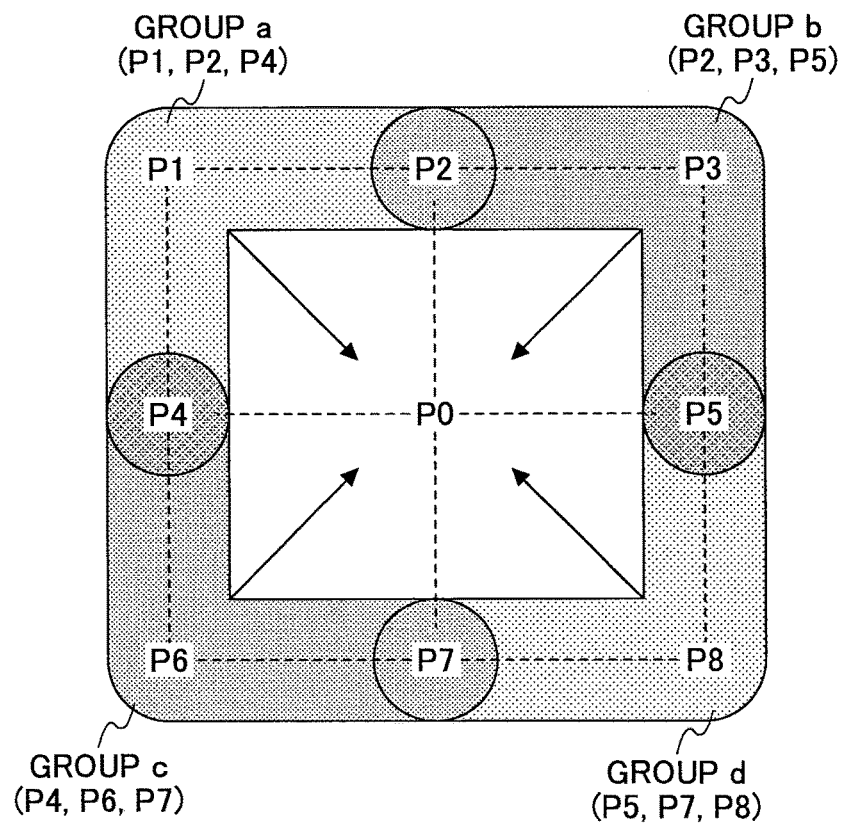
FIG. 5 is a table showing status values to be used in an embodiment of the present invention.
FIG. 6 is a drawing schematically showing extrapolation which is used in an embodiment of the present invention.

The status values of this embodiment may have the values as shown in FIG. 5. The status value "0" denotes an unconfirmed status where the feature point is not interpolated. The status value "1" denotes a confirmed status where the feature point has existed since the initial status. The status value "2" denotes a status where the feature point is interpolated.

In step S402, the interpolation target extracting section 202 refers to the status buffer 207, and extracts the "unconfirmed" feature point (i.e., the feature point having the status value $S[i,j]=0$). In step S403, the interpolating section 203 calculates the coordinates of the unconfirmed feature point extracted in step S402.

In this embodiment, as shown in FIG. 6, eight feature points (P1 through P8), which are located near the feature point (P0) to be interpolated, are divided into groups. Then, extrapolation coordinates of the groups are calculated. After considering the significance of the extrapolation, the coordinates of the feature point (P0) to be interpolated is derived from the extrapolation coordinates. By doing this, the unconfirmed feature point is interpolated.

More specifically, the interpolating section 203 calculates the extrapolation coordinates (xa, ya) of a group "a" including the feature points P1, P2, and P4, the extrapolation coordinates (xb, yb) of a group "b" including the feature points P2, P3, and P5, the extrapolation coordinates (xc, yc) of a group "c" including the feature points P4, P6, and P7, the extrapolation coordinates (xd, yd) of a group "d" including the feature points P5, P7, and P8, and respective flags Fa, Fb, Fc, and Fd which are information indicating the significance of the extrapolation.

(1) Group "a"

i) when the feature points P1, P2, and P4 exist, and the status is not unconfirmed $$(xa,ya)=(x2+x4-x1,y2+y4-y1)$$

$$Fa=1$$

ii) Otherwise $$(xa,ya)=(0,0)$$

$$Fa=0$$

(2) Group "b"

i) when the feature points P2, P3, and P5 exist, and the status is not unconfirmed $$(xb,yb)=(x2+x5-x3,y2+y5-y3)$$

$$Fb=1$$

ii) Otherwise $$(xb,yb)=(0,0)$$

$$Fb=0$$

(3) Group "c"

i) when the feature points P4, P6, and P7 exist, and the status is not unconfirmed $$(xc,yc)=(x4+x7-x6,y4+y7-y6)$$

$$Fc=1$$

ii) Otherwise $$(xc,yc)=(0,0)$$

$$Fc=0$$

(4) Group "d"

i) when the feature points P5, P7, and P8 exist, and the status is not unconfirmed $$(xd,0)=(x5+x7-x8,y5+y7-y8)$$

$$Fd=1$$

ii) Otherwise $$(xd,yd)=(0,0)$$

$$Fd=0 \quad \text{formula 2}$$

Here, symbols (x1,y1), (x2,y2), (x3,y3), (x4,y4), (x5,y5), (x6,y6), (x7,y7), and (x8,y8) denote the coordinates of the feature points P1 through P8, respectively. When the feature points exist near the feature point to be interpolated and the status of the feature points is not "unconfirmed" (i.e., the extrapolation is significant), a value "1" is set to the flags Fa, Fb, Fc, and Fd. On the other hand, when no feature point exists near the feature point to be interpolated because, for example, the feature point to be interpolated is located at an edge portion (e.g., upper or lower edge part) of the capture image, a value "0" is set to the flags Fa, Fb, Fc, and Fd.

Further, the interpolating section 203 may derive interpolation coordinates of the feature point by using the following formula 3.

$$x[i,j]=(xa+xb+xc+xd)/(Fa+Fb+Fc+Fd)$$

$$y[i,j]=(ya+yb+yc+yd)/(Fa+Fb+Fc+Fd) \quad \text{formula 3}$$

Further, when all the extrapolation is not significant (i.e., when Fa=Fb=Fc=Fd=0), it is assumed that the interpolation coordinates of the feature point (P0) to be interpolated is not calculated.

Next, in step S404, the status updating section 204 updates the status value of the feature point, which is interpolated in the previous step S403, to a value indicating that the feature point has been interpolated (S[i,j]=2).

In step S405, the interpolation controlling section 201 refers to the status value of the feature point stored in the status buffer 207, and determines whether there exists the unconfirmed feature point. When it is determined that there exists the unconfirmed feature point (YES in step S405), the process goes back to step S402, and the processes from step S402 to step S405 are repeatedly executed until the unconfirmed feature point does not exist.

On the other hand, when it is determined that there exists no feature point (NO in step S405), the process branches to step S406. In step S406, the interpolation controlling section 201 calculate a confidence rating "C" of the interpolation process based on the following formula 4. The process ends in step S407.

$$D=1000\times(\text{the number of interpolated feature points})/(M \times N)$$

$$C=\text{MAX}\{100-D,0\} \quad \text{formula 4}$$

Where "C" and "D" are variables, and MAX{ } denotes a function to output the maximum value in the parenthesis "{ }".

For example, when the ratio of the interpolated feature points to all is 1%, the confidence rating "C" is 90%. Further, when the ratio of the interpolated feature points to all is 2%, the confidence rating "C" is 80%. The data of the confidence rating "C" and the coordinates of the feature point may be output to an external device as a pattern extraction result.

Figure 7:
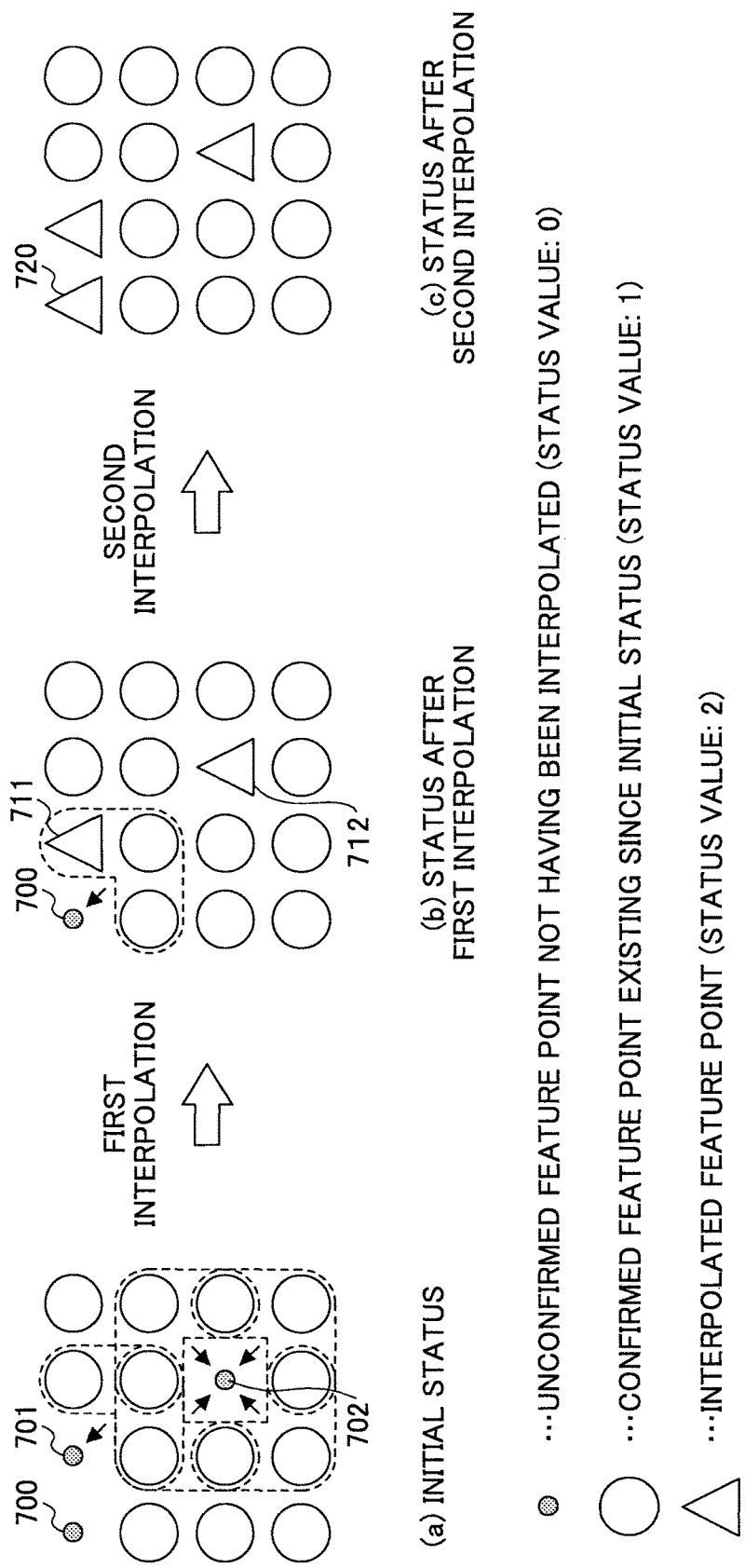
FIG. 7 is a drawing schematically showing an interpolation process according to an embodiment of the present invention.

FIG. 7 schematically shows the interpolation process according to this embodiment described above. According to an embodiment of FIG. 7, there are three unconfirmed feature points 700, 701, and 702 in the initial status. Among these, it is possible to perform the extrapolation on the feature points 701 and 702 using the near-by feature points. Therefore, in the first interpolation process, those feature points 701 and 702 are interpolated. The status value of the feature points 711 and 712 after the interpolation is set to a value indicating the status that the feature point is interpolated (i.e., S[i,j]=2).

As a result of the first interpolation, the coordinates of the feature point 711 are calculated. Accordingly, it becomes possible to perform the interpolation on the unconfirmed feature point 700. By performing the second interpolation process, the unconfirmed feature point 700 is interpolated. The status value of the feature point 720 after the interpolation is also set to the value indicating the status that the feature point is interpolated (i.e., S[i,j]=2). In the embodiment of FIG. 7, after the second interpolation process, there is no unconfirmed point. Therefore, the process ends.

As described above, according to an embodiment, even when some feature points of the correction pattern are defective due to the reduction of the quality of the captured image, it may become possible to calculate the coordinates of the defective feature points, so that all the feature points may be completely extracted. Accordingly, it may become possible to sophisticatedly calculate the distortion amount between the correction pattern presented in the captured image and the original correction pattern to be projected. Therefore, it may become possible to improve the quality of the image correction.

Further, in this embodiment, the confidence rating may be acquired along with the coordinates of the feature points. Based on the value (level) of the confidence rating, a user may pay attention to the reliability or accuracy of the interpolation, so that the usability may further be improved. Also, it may become possible to extract the feature point using another image processing algorithm based on the confidence rating level of the feature points.

FIG. 8 shows other status values used in the pattern extracting device according to another embodiment. In the following, with reference to FIGS. 8 and 9, a difference is described between the use of the status values in this embodiment and the use of the status values in the embodiment described with reference to FIGS. 2 through 7.

In the embodiment of FIG. 8, there are values "0" through "3" that may be set as the status values. The status value "0" denotes the unconfirmed status where the feature point is not interpolated. The status value "1" denotes the confirmed status where the feature point has existed since the initial status. The status value "2" denotes a status where the feature point is interpolated using the feature point having the status value "1" (interpolation "A"). The status value "3" denotes a status where the feature point is interpolated using the feature point having been interpolated (interpolation "B").

In this embodiment, in step S403 of FIG. 4, to calculate the coordinates of the unconfirmed feature point, the interpolating section 203 refers to the status values of the feature points used in the extrapolation stored in the status buffer 207, determines whether there is the feature point that has been interpolated among the feature points, and associates and stores the determination result with the feature point to be interpolated.

Next, in the updating process of the status values in step S404, the status updating section 204 determines whether there is a feature point that has already been interpolated among the near-by feature points used in the extrapolation based on the determination result stored by the interpolating section 203.

When it is determined that there is no feature point that has already been interpolated among the near-by feature points used in the extrapolation, the status updating section 204 updates the status value of the feature point interpolated in previous step S403 to the value indicating the interpolation "A" (i.e., S[i,j]=2). On the other hand, when it is determined that the there exists a features point that has already been interpolated among the near-by feature points used in the extrapolation, the status updating section 204 updates the status value of the feature point interpolated in previous step S403 to the value indicating the interpolation "B" (i.e., S[i,j]=3).

Next, in the calculation process of the confidence rating in step S406, the interpolation controlling section 201 calculates the confidence rating "C" based on the following formula 5.

$$DA = 1000 \times (\text{the number of interpolated feature points having interpolation "}A\text{" status})/(M \times N)$$

$$DB = 2000 \times (\text{the number of interpolated feature points having interpolation "}B\text{" status})/(M \times N)$$

$$C = \text{MAX}\{100 - DA - DB, 0\} \qquad \text{formula 5}$$

Where "C", "DA", and "DB" are variables, and MAX{ } denotes a function to output the maximum value in the parenthesis "{ }".

For example, when the ratio of the interpolated feature points having an interpolation "A" status to all is 1%, the confidence rating "C" is 90%. When the ratio of the interpolated feature points having an interpolation "B" status to all is 1%, the confidence rating "C" is 80%. Namely, as described above, the feature point having the interpolation "B" status has already been interpolated using the interpolated feature point. Therefore, the confidence rating of the feature point having the interpolation "B" status may be lower than that of the feature point having the interpolation "A" status. As described above, in this embodiment, when the feature point in interpolated, it may become possible to evaluate the reliability and accuracy of the interpolation process depending on the status of the feature point that is used for the interpolation.

Figure 9:
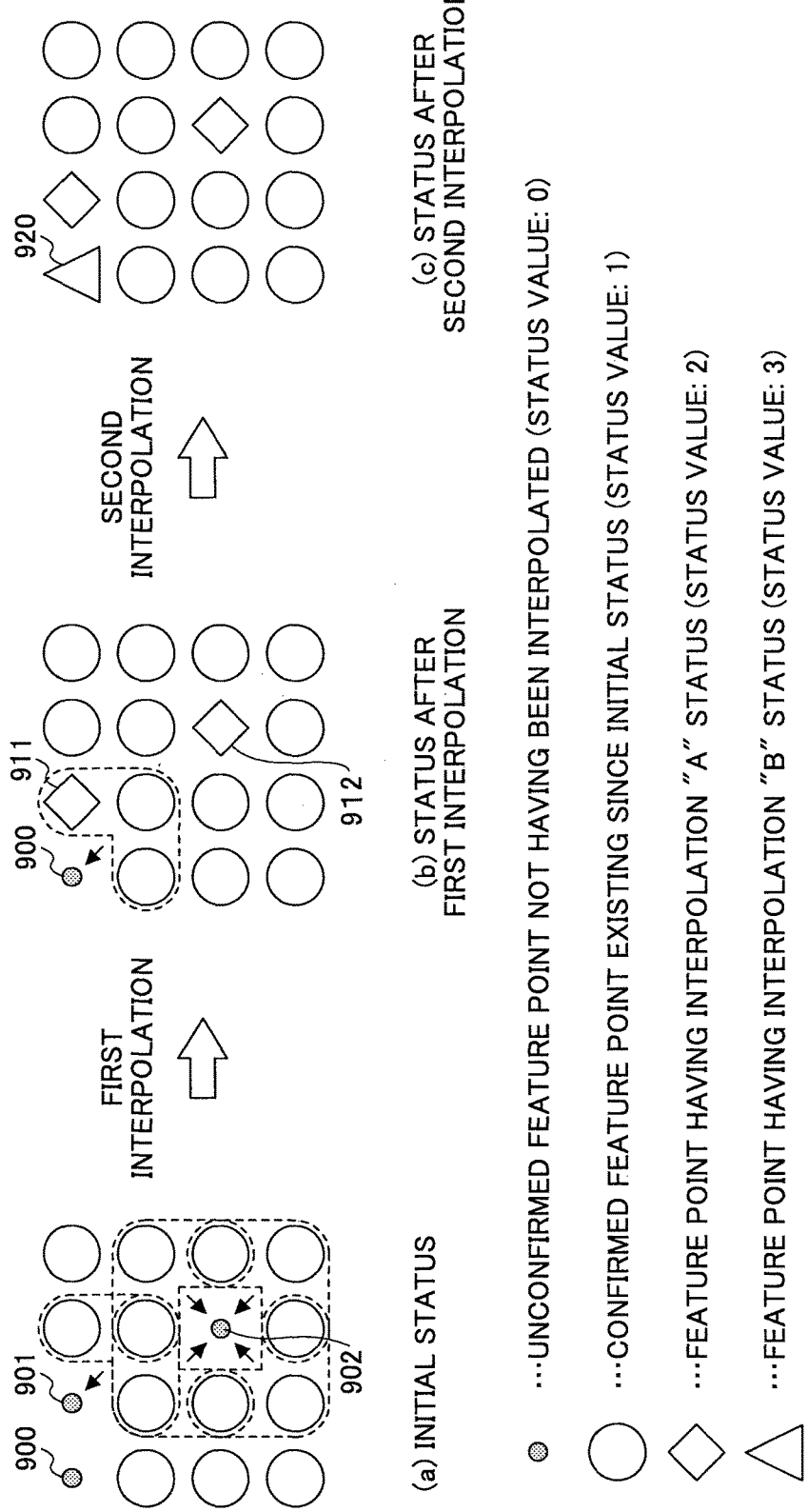
FIG. 9 is a drawing schematically showing the interpolation process according to an embodiment described with reference to FIG. 8.

FIG. 9 schematically shows the interpolation process according to this embodiment described with reference to FIG. 8. In this embodiment of FIG. 9, there are three unconfirmed feature points 900, 901, and 902 in the initial status. Among those, the extrapolation may be performed on the feature points 901 and 902 using the near-by feature points. Therefore, in the first interpolation process, those feature points 901 and 902 may be interpolated. Further, the first interpolation process may be performed without using any feature points having the interpolation "A" or interpolation "B" status. Therefore, the status of the feature points 911 and 912 after the interpolation is interpolation "A" (i.e., S[i,j]=2).

As a result of the calculation of the coordinates of the feature point 911 in the first interpolation process, it becomes possible to perform the interpolation on the unconfirmed feature point 900. Accordingly, by performing the second interpolation process, the unconfirmed feature point 900 may be interpolated. In the second interpolation process, due to the use of the feature point 911 that has been interpolated in the first interpolation process, the status of the feature point 920 after the interpolation is interpolation "B" (i.e., S[i,j]=3). In the embodiment of FIG. 9, after the second interpolation process, there is no remaining unconfirmed feature point. Therefore, the interpolation process ends.

Figure 10:
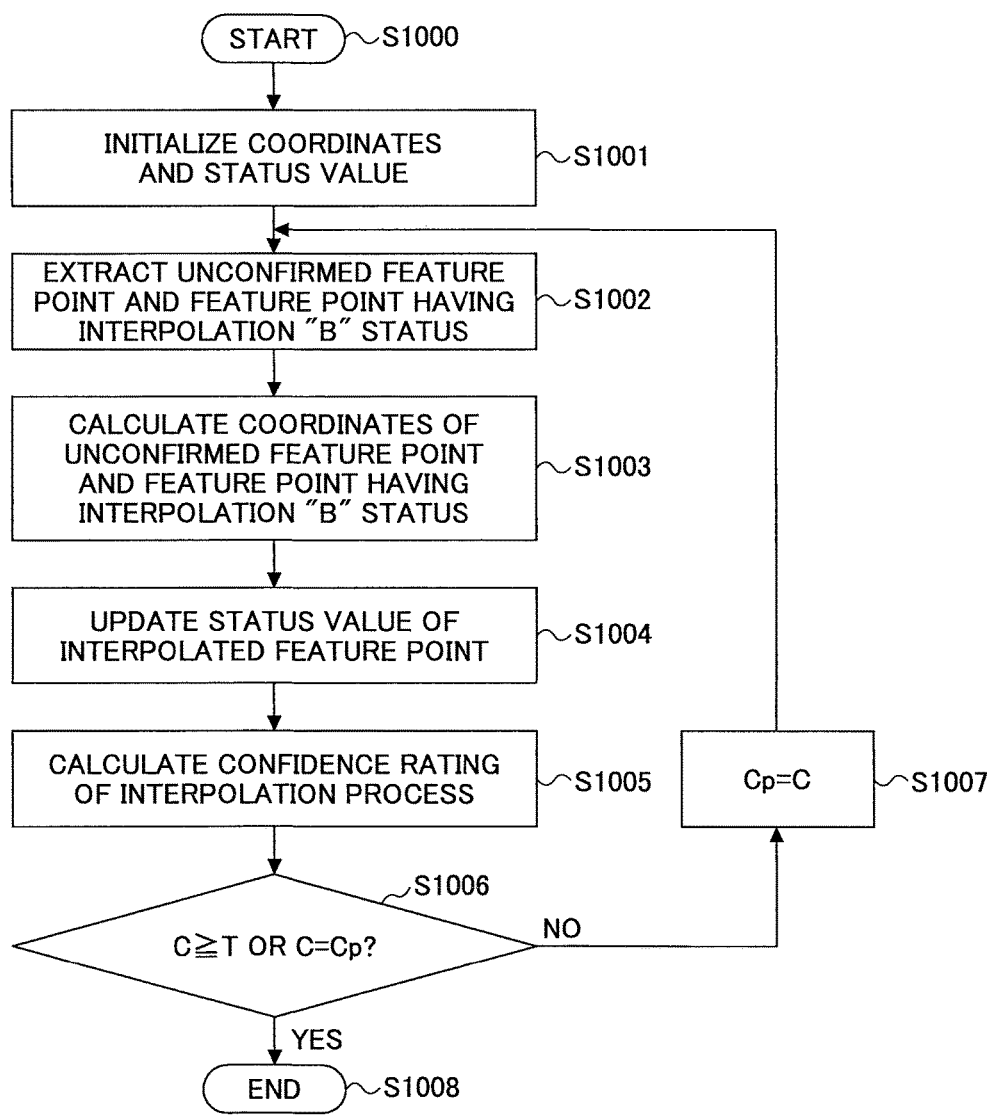
FIG. 10 is a flowchart showing a process performed by the pattern extracting device according to an embodiment of the present invention.

FIG. 10 is a flowchart of a process performed by the pattern extracting device according to this embodiment. In the following, with reference to FIGS. 10 and 11, a difference is described between the use of the status values in this embodiment and the use of the status values in the embodiment described with reference to FIGS. 8 and 9.

In the process of FIG. 10, the process starts in step S1000. In step S1001, the interpolation controlling section 201 initializes the coordinates and the status values stored in the coordinate data buffer 206 and the status buffer 207, respectively, of the storage section 205 by using formula 1.

In step S1002, the interpolation target extracting section 202 refers to the status buffer 207, and extracts the unconfirmed feature point (i.e., the feature point where S[i,j]=0) and the feature point having the interpolation "B" status (i.e., S[i,j]=3). In step S1003, similar to step S403 in FIG. 4, the interpolating section 203 calculates the coordinates of the unconfirmed feature point and the feature point having the interpolation "B" status which are extracted in step S1002.

In step S1003, in the calculation of the feature point having the interpolation "B" status, the interpolating section 203 calculates a difference "DP" based on the following formula 6, the difference being between the coordinates (xp,yp) of the feature point having the interpolation "B" status calculated in the preceding interpolation process and the coordinates (x,y) of the feature point having the interpolation "B" status calculated in this interpolation process.

$$DP=SQRT\{(x-xp)^2+(y-yp)^2\} \qquad \text{formula 6}$$

where, "SQRT{ }" denotes square root, and "^" denotes power.

Further, in step S1003, similar to the embodiment of FIG. 8, in the calculation of the coordinates of the feature point, the interpolating section 203 refers to the status values of the feature points used in the extrapolation stored in the status buffer 207, determines whether the feature point having already been interpolated is included in the feature points, and associates and stores the determination result with the feature point to be interpolated.

Next, in the following step S1004 where the status value is updated, the status updating section 204 uses the determination result stored by the interpolating section 203, and determines whether there is the feature point having already interpolated among the near-by feature points used in the extrapolation. When it is determined that there is no feature point having already been interpolated among the near-by feature points used in the extrapolation, the status updating section 204 updates the status value of the feature point having been interpolated in the previous process of step S1003 to the value indicating the interpolation "A" status (i.e., S[i,j]=2).

On the other hand, when it is determined that there is a feature point having already been interpolated included in the near-by feature points used in the extrapolation, the status updating section 204 further determines whether the difference DP is less than or equal to a threshold value DT. Preferably, the threshold value DT may be a value indicating the confidence rating which is equivalent to that in the interpolation using the confirmed feature points.

When the difference DP is less than or equal to the threshold value DT, the status updating section 204 updates the status value of the feature point having been interpolated in the previous step S1003 to the value indicating the interpolation "A" status (i.e., S[i,j]=2). On the other hand, when it is determined that the difference DP is greater than the threshold value DT, the status updating section 204 updates the status value of the feature point having been interpolated in the previous step S1003 to the value indicating the interpolation "B" status (i.e., S[i,j]=3).

In step S1005, the interpolation controlling section 201 uses formula 5 and calculates the confidence rating "C" of the interpolation process. In this embodiment, even when the near-by feature points used in the extrapolation include the feature point having been interpolated, if the coordinates acquired by the preceding interpolation process approximate the coordinates acquired by this interpolation process, it may be thought that stable convergence is achieved and a higher confidence rating "C" may be given.

In step S1006, the interpolation controlling section 201 determines whether the confidence rating "C" is greater than or equal to a threshold value T or whether the confidence rating "C" is the same as a confidence rating "Cp" which is the confidence rating of the preceding interpolation process. The threshold value T may be arbitrarily set based on desired reliability and accuracy of the interpolation. Further, it is assumed that the initial value of the confidence rating "Cp" is set to an impossible value as the confidence rating (e.g., 999).

When it is determined that the confidence rating "C" is less than the threshold T and the confidence rating "C" is different from the confidence rating "Cp" (NO in step S1006), the process goes (branches) to step S1007. In step S1007, the interpolation controlling section 201 sets the value of the confidence rating "C" acquired in step S1005 to the value of the confidence rating "Cp". Then, the process goes back to step S1002. On the other hand, when it is determined that the confidence rating "C" is greater than or equal to the threshold T or the confidence rating "C" is equal to the confidence rating "Cp" (YES in step S1006), the process ends in step S1008.

In this embodiment, the interpolation process may be terminated when the confidence rating "C" is greater than or equal to a certain confidence rating value or when the confidence rating "C" converges to a certain confidence rating. However, according to another embodiment, the interpolation process may be terminated when the confidence rating "C" reaches a confidence rating that is designated by a user.

Figure 11:
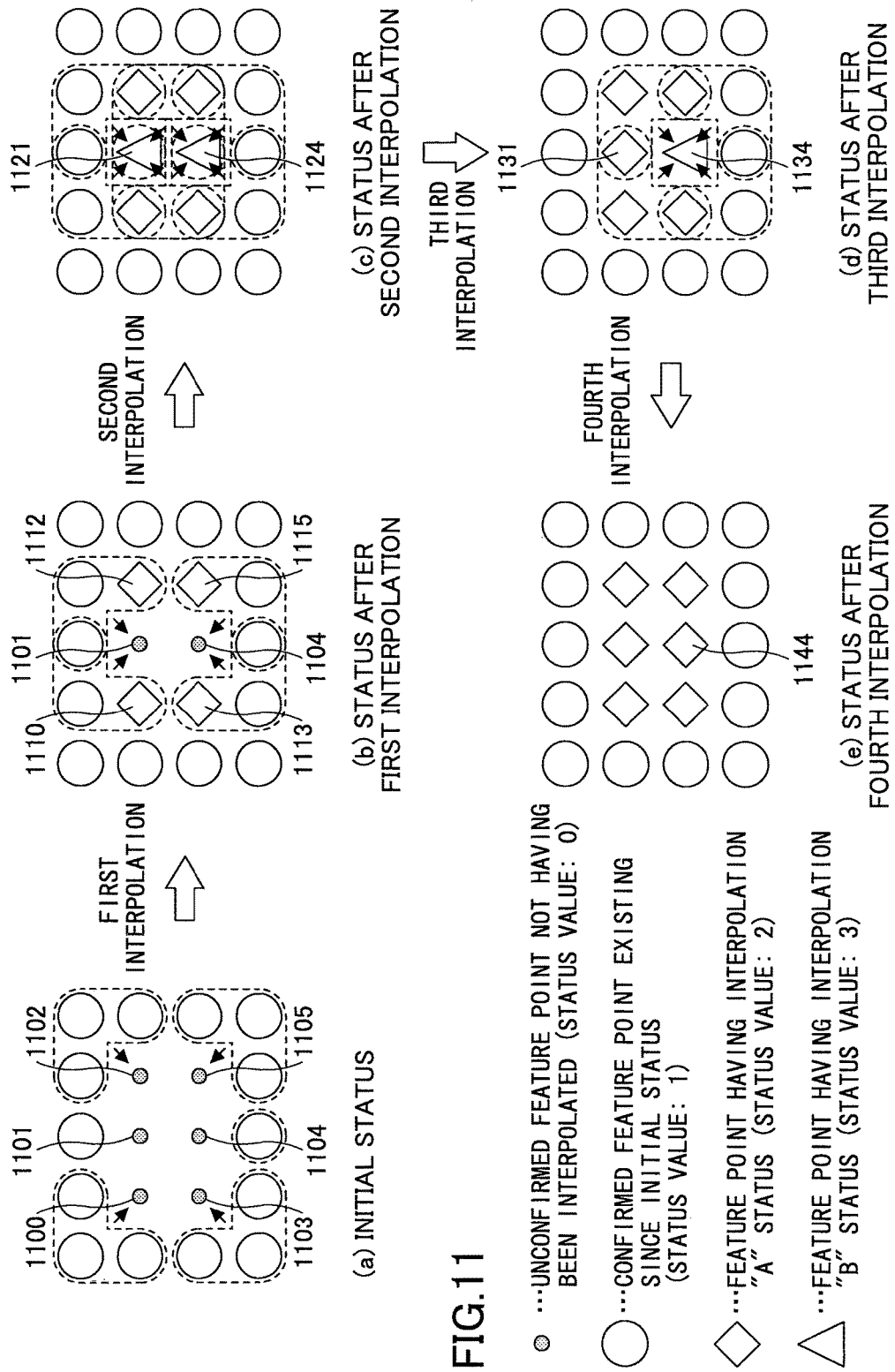
FIG. 11 is a drawing schematically showing the interpolation process according to the embodiment described with reference to FIG. 10.

FIG. 11 schematically shows an interpolation process according to an embodiment described with reference to FIG. 10. In the embodiment of FIG. 11, there are six unconfirmed feature points 1100 through 1105. Among these, the extrapolation may be performed only on the feature points 1100, 1102, 1103, and 1105 by using the respective nearby feature points. Therefore, the interpolation is performed on those feature points 1100, 1102, 1103, and 1105. In the respective interpolation processes, no feature point having already been interpolated is used. Therefore, the status of the feature points 1100, 1102, 1103, and 1105 after the interpolation processes is interpolation "A" (i.e., S[i,j]=2).

As a result that the coordinates of the feature points 1100, 1102, 1103, and 1105 are calculated, the extrapolation may further be performed on the unconfirmed feature points 1101 and 1104. Therefore, by performing the second interpolation process, the unconfirmed feature points 1101 and 1104 are interpolated. As a result of the second interpolation process, due to the use of the feature points having been interpolated in the first interpolation process, the status of the feature points 1121 and 1124 after the interpolation is interpolation "B" (i.e., S[i,j]=3).

Next, as described above, since the status of the feature points 1121 and 1124 is interpolation "B" (i.e., S[i,j]=3), an additional interpolation process is performed on the feature points 1121 and 1124. In the interpolation performed on the feature point 1121, although the feature point having already been interpolated is used, since the difference DP of this interpolation is less than the threshold value DT, the status of the feature point 1131 after the interpolation is interpolation "A" (i.e., S[i,j]=2). On the other hand, in the interpolation performed on the feature point 1124, since the difference DP of this interpolation is greater than the threshold value DT, the status of the feature point 1134 after the interpolation is maintained at the interpolation "B" (i.e., S[i,j]=3).

Next, due to the status of the feature point being interpolation "B" (i.e., S[i,j]=3), an additional interpolation is performed on the feature point 1134. In this interpolation, although the feature points having already been interpolated are used, since the difference DP is less than or equal to the threshold value DT in this interpolation of this embodiment, the status of the feature point 1144 becomes interpolation "A" (i.e., S[i,j]=2).

In the embodiment of FIGS. 10 and 11, the interpolation process may be repeatedly performed on not only the unconfirmed feature point but also the feature point having the interpolation "B" status value (i.e., the feature point having a lower confidence rating). Therefore, it may become possible to improve the reliability of the interpolation process.

Figure 12:
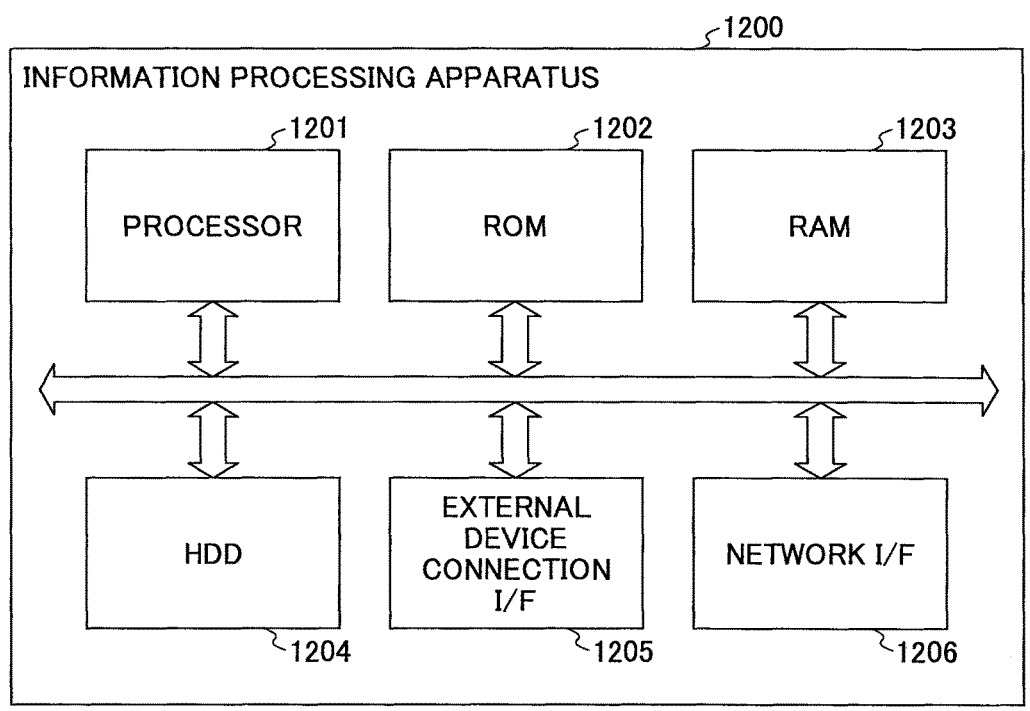
FIG. 12 is a drawing showing an information processing apparatus that executes a program according to an embodiment of the present invention.

FIG. 12 shows an information processing apparatus including the pattern extracting device according to an embodiment. An information processing apparatus 1200 may be a computer including, for example, a desktop computer, a tablet type computer, and a laptop type computer. The information processing apparatus 1200 includes a processor 1201, a Read Only Memory (ROM) 1202, a Random Access Memory (RAM) 1203, a Hard Disk Device (HDD) 1204, an external device connection interface 1205, and a network interface 1206.

The processor 1201 is a device that executes a process performed by the information processing apparatus 1200. Various processors such as a Central Processing Unit (CPU) and a microprocessor unit (MPU) may be used as the processor 1201. The ROM 1202 is a non-volatile memory storing a boot program such as a BIOS.

The RAM 1203 is a non-volatile memory providing a space for program execution. The information processing apparatus 1200 realizes the above functional means on the information processing apparatus 1200 by loading and executing a program according to an embodiment described in a program language such as assembler, C, C++, Java (registered trademark), JAVA SCRIPT (registered trademark), PERL, RUBY, PYTHON or the like under the control of an operating system such as WINDOWS (registered trademark) series, Mac (registered trademark) OS, UNIX (registered trademark), LINUX (registered trademark) or the like.

The Hard Disk Device 1204 is a large-scale non-volatile memory storing the program according to an embodiment of the present invention and various data. The program according to an embodiment may be stored in a device-readable recording medium such as a CD-ROM, MO, flexible disk, EEPROM, EPROM or the like to be installed. Further, the program according to an embodiment may also be installed via a network. The Hard Disk Device 1204 may store the coordinate data of the feature points included in the captured image of the correction pattern.

The network interface 1206 is an interface to connect to an external network and is a physical interface such as a LAN cable connector, a modular cable connector or the like. The pattern extraction result may be transmitted to an external device via the network interface 1206.

The external device connection interface 1205 is an interface to connect to an input device such as a mouse and keyboard, a display device, a print device, an image capturing device and the like, and is a physical interface such an a USB port. The coordinate data of the feature points of the correction pattern included in the captured image may be acquired from the image capturing device such an a digital camera which is connected via the external device connection interface 1205. The pattern extraction result may be output to the display device and the print device via the external device connection interface 1205.

Figure 13:
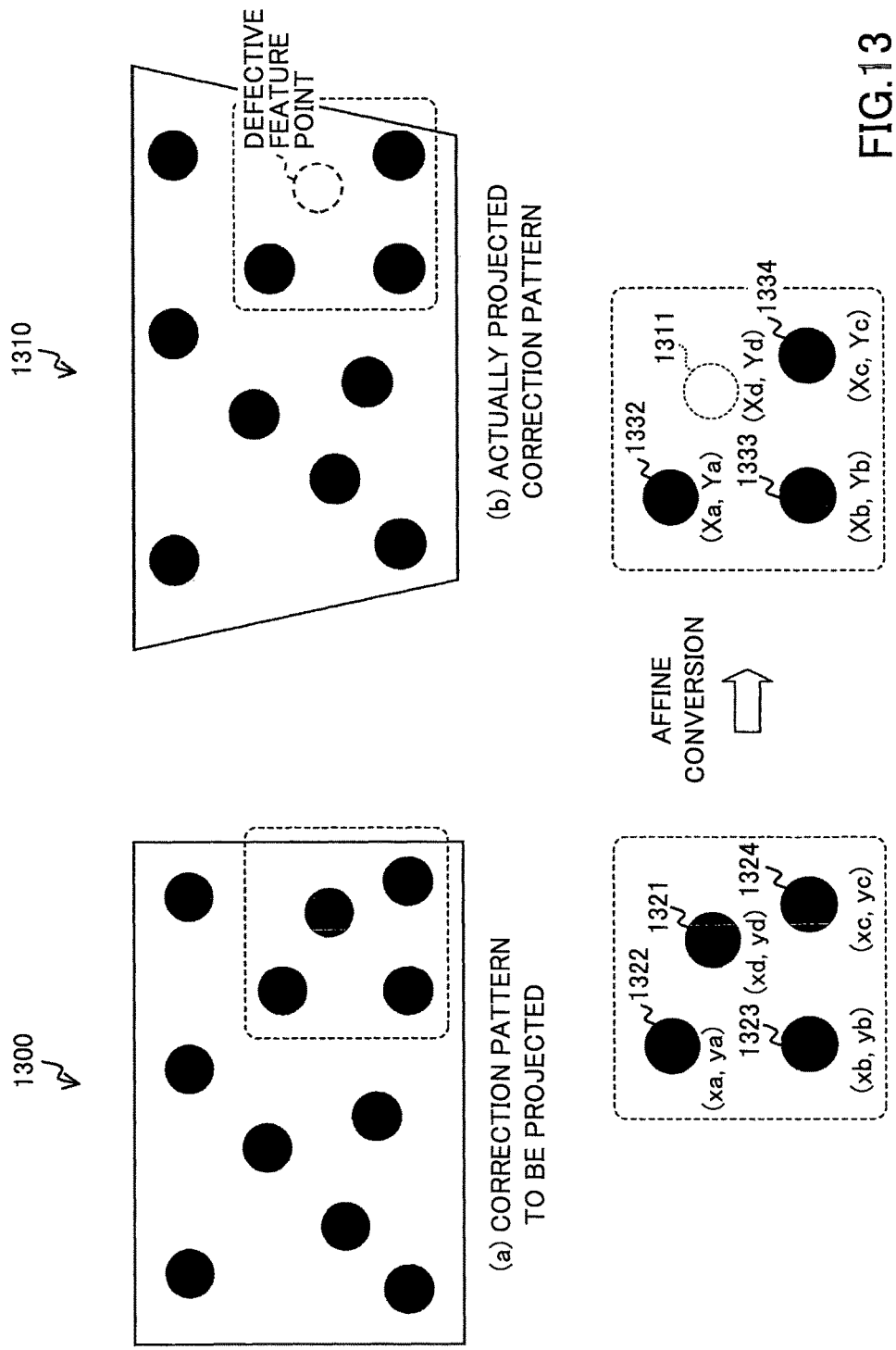
FIG. 13 is a drawing schematically showing an interpolation process according to another embodiment of the present invention.

FIG. 13 schematically shows the interpolation process according to another embodiment of the present invention.

In the embodiment of FIG. 13, a correction pattern 1300 is used in which the feature points thereof are not arranged on the grid cross points.

The correction pattern 1300 is an image pattern to be projected by a projecting device such as a projector. A correction pattern 1310 is an image pattern that is projected from the correction pattern 1300 by the projecting device. In the correction pattern 1310, the positions of the black circles, which are feature points, are irregularly shifted, and one feature point is defective (missing).

In this embodiment, the pattern extracting device 200 specifies the feature point 1321 (hereinafter may be referred to as a "reference feature point") of the correction pattern 1300 corresponding to the defective feature point 1311, and further specifies the near-by feature points 1322, 1323, and 1324 located near the reference feature point 1321. Then, the pattern extracting device 200 calculates the coordinates of the defective feature point 1311 by using the specified coordinates of the reference feature point 1321, and the near-by feature points 1322, 1323, and 1324, and the coordinates of near-by feature points 1332, 1333, and 1334 located near the defective feature point 1311.

Figure 14:
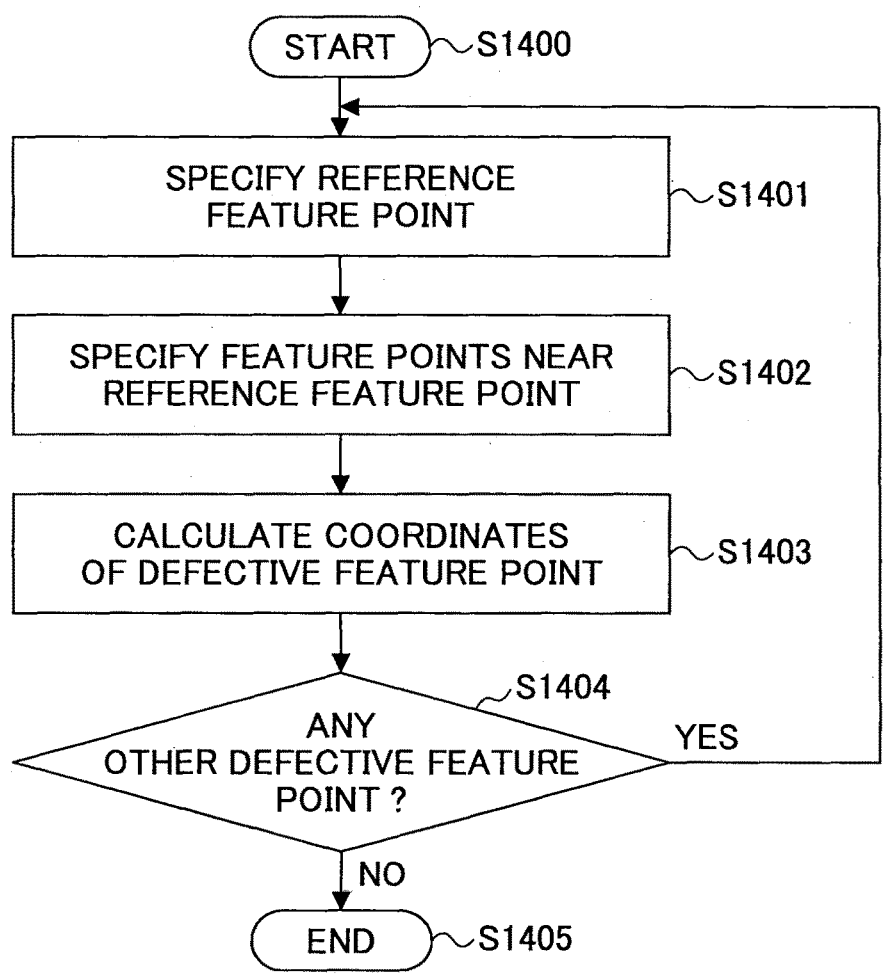
FIG. 14 is a flowchart showing an interpolation process of FIG. 13 according to the embodiment of the present invention.

FIG. 14 is a flowchart showing the interpolation process described with reference to FIG. 13. In the process of FIG. 14, the process starts in step S1400. In step S1401, the interpolation controlling section 201 or the interpolation target extracting section 202 compares the feature points included in the correction pattern to be projected and the feature points included in the projected correction pattern, and specifies the feature point which is not in correspondence therebetween (i.e., reference feature point).

In step S1402, the interpolating section 203 specifies a plurality of the feature points near the reference feature point (near-by feature points). In this embodiment, the interpolating section 203 may specify the near-by feature points by calculating the Euclidean distances between the feature points included in the original correction pattern and the reference feature point using the coordinates of the reference feature point and the coordinates of the feature points included in the original correction pattern.

In step S1403, the interpolating section 203 calculates the coordinates of the defective feature point by using the coordinates of the reference feature point, the coordinates of the near-by feature points near the reference feature point, and the coordinates of the near-by feature points near the defective feature point.

Specifically, the interpolating section 203 calculates Affine coefficients "a", "b", "c", "d", "e", and "f" by substituting the coordinates (xa, ya), (xb, yb), and (xc, yc) of the near-by feature points near the reference feature point and the coordinates (Xa, Ya), (Xb, Yb), and (Xc, Yc) of the near-by feature points near the defective feature point into the following formula 7. Further, the interpolating section 203 may calculate the coordinates (Xd, Yd) of the defective feature point by applying the derived Affine coefficients into formula 7 and substituting the coordinates (xd, yd) of the reference feature point.

$$X = a^*x + b^*y + e$$

$$Y = c^*x + d^*y + f \qquad \text{formula 7}$$

In step S1404, the interpolation controlling section 201 determines whether there is another defective feature point by using the comparison result in step S1401. When it is determined that there is another defective feature point (YES in step S1404), the process goes back to step S1401 to calculate the coordinates of the defective feature point. On the other hand, when it is determined that there is no other defective feature point (NO in step S1404), the process ends in step S1405.

In this embodiment, upper-ranked feature points which are closer to the reference feature point are used as the near-by feature points. However, in another embodiment, arbitrarily ranked feature points, which are, for example, the first, second, and fourth ranked feature points may be used as the near-by feature points. Further, in this embodiment, three feature points are used to interpolate the defective feature point. However, in another embodiment, four or more near-by feature points may be used to interpolate the defective feature point.

Further, in this embodiment, when the near-by feature points near the reference feature point are specified, those near-by reference points are specified without setting (using) an upper limit of the distance, which is between the feature points and the reference feature point, by which the feature points are determined to be located near the reference feature point. However, in another embodiment, the near-by reference points may be specified by setting (using) the upper limit of the distance by which the feature points may be specified to be located near the reference feature point.

FIG. 17 shows a method of specifying the near-by feature points by setting the upper limit of the distance by which the feature points may be specified as the near-by feature points near the reference feature point. In the following, with reference to FIG. 17, there is described the method of specifying the near-by feature points by setting the upper limit of the distance by which the feature points may be specified as the near-by feature points near the reference feature point and interpolating the defective feature point.

In an actually-projected correction pattern 1700 of FIG. 17, there are three defective feature points. As described with reference to FIG. 14, the interpolating section 203 specifies the reference feature points corresponding to the defective feature points. In this embodiment, it is assumed that a reference feature point 1701 is specified first.

Further, the interpolating section 203 determines whether a predetermined number of feature points which are not defective (missing) within a range of a predetermined distance 1702 from the reference feature point 1701 as the center of the range. In this embodiment, an arbitrary Euclidean distance may be used as the predetermined distance.

As shown in FIG. 17, there is only one feature point which is not defective within the range of the predetermined distance 1702 from the reference feature point 1701 as the center of the range. Therefore, the interpolating section 203 does not interpolate the defective feature point corresponding to the reference feature point 1701, and performs the interpolation process on another defective feature point.

Next, the interpolating section 203 specifies a reference feature point 1703 corresponding to another defective feature point. As shown in FIG. 17, there exist three feature points 1705, 1706, and 1707, which are not defective, within a range of a predetermined distance 1704 from the reference feature point 1703 as the center. Therefore, the interpolating section 203 interpolates the defective feature point corresponding to the reference feature point 1703 by using the coordinates of those three feature points and the coordinates of the reference feature point 1703. In the same manner, the interpolating section 203 interpolates the defective feature point corresponding to the reference feature point 1708 by using the coordinates of the feature points 1707, 1709, and 1710, which are not defective, and the coordinates of the reference feature point 1708.

Further, the interpolating section 203 interpolates the defective feature point corresponding to the reference feature point 1701 by using the feature point 1710, which exists within the range of the predetermined distance 1702 from the reference feature point 1701 as the center of the range, and the interpolated feature points 1720 and 1721. As a result, in the embodiment of FIG. 17, the status information of the interpolated feature points 1720 and 1721 indicates interpolation "A", and the status information of the interpolated feature point 1722 indicates interpolation "B".

Figure 15:
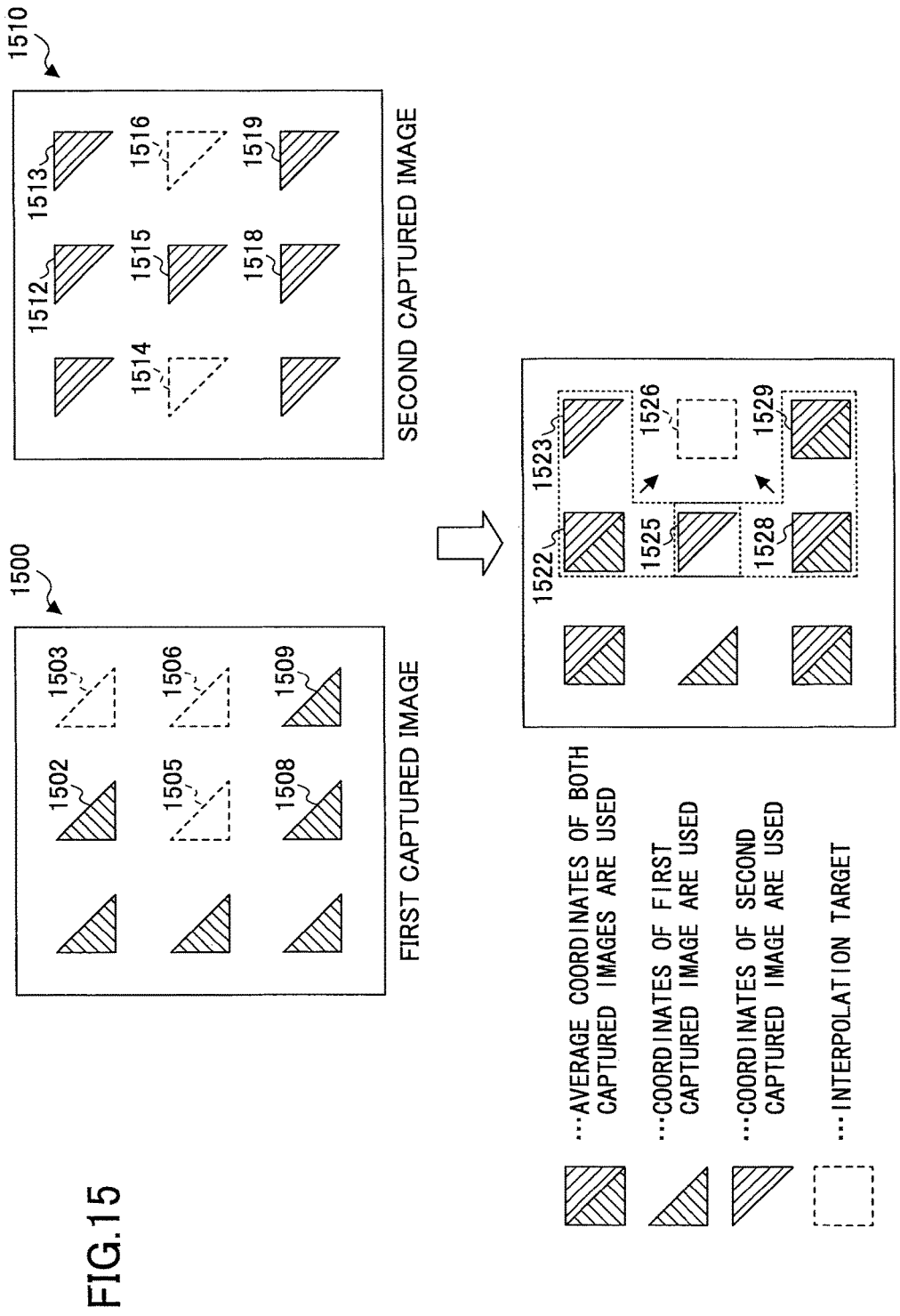
FIG. 15 is a drawing schematically showing a process of interpolating feature points of the correction pattern using a plurality of captured images according to an embodiment.

FIG. 15 schematically shows a process of interpolating the feature point of the correction pattern by using a plurality of captured images according to an embodiment. In the following, with reference to FIG. 15, a process is described in which two of the captured images are used to interpolate the feature point of the correction pattern. Further, in another embodiment, three or more of the captured images may be used.

A first captured image 1500 is a captured image of the correction pattern generated by the image capturing device. A second captured image 1510 is a captured image of the same correction pattern captured from the same position as that in the first captured image 1500 but is captured in different conditions such as different exposure time and different white balance setting.

In another embodiment, the second captured image may be generated by changing the tone of the first captured image by correcting the gamma value. Further, when the interpolation is performed by digitizing the first captured image, the image to be interpolated may be obtained by changing the threshold value for the digitization.

In the first captured image 1500, the feature points that should have been in the regions 1503, 1505, and 1506 are defective (missing). In the second captured image 1510, the feature points that should have been in the regions 1514 and 1516 are defective (missing).

In the embodiment of FIG. 15, the interpolation controlling section 201 or the interpolation target extracting section 202 extracts the feature point to be interpolated that should be in a defective part 1526 by using the coordinate information of the feature points included in the first captured image 1500 and the coordinate information of the feature points included in the second captured image 1510.

In the embodiment of FIG. 15, as the coordinates of the feature point 1522, an average value of the coordinates of the feature point 1502 and the coordinates of the feature point 1512 are used. Further, as the coordinates of the feature points 1523 and 1525, the coordinates of the feature points 1513 and 1515, respectively, are used. Further, as the coordinates of the feature point 1528, an average value of the coordinates of the feature point 1508 and the coordinates of the feature point 1518 are used, and as the coordinates of the feature point 1529, an average value of the coordinates of the feature point 1509 and the coordinates of the feature point 1519 are used.

The interpolating section 203 calculates the coordinates of the feature point in the defective part 1526 by using the coordinate of the feature points near the feature point in the defective part 1526 that may be used for the calculation as described above.

As described above, in this embodiment, by extracting the interpolation target by using the plurality of captured images, it may become possible to reduce the number of the feature points to be interpolated and improve the accuracy of the interpolation.

Figure 16:
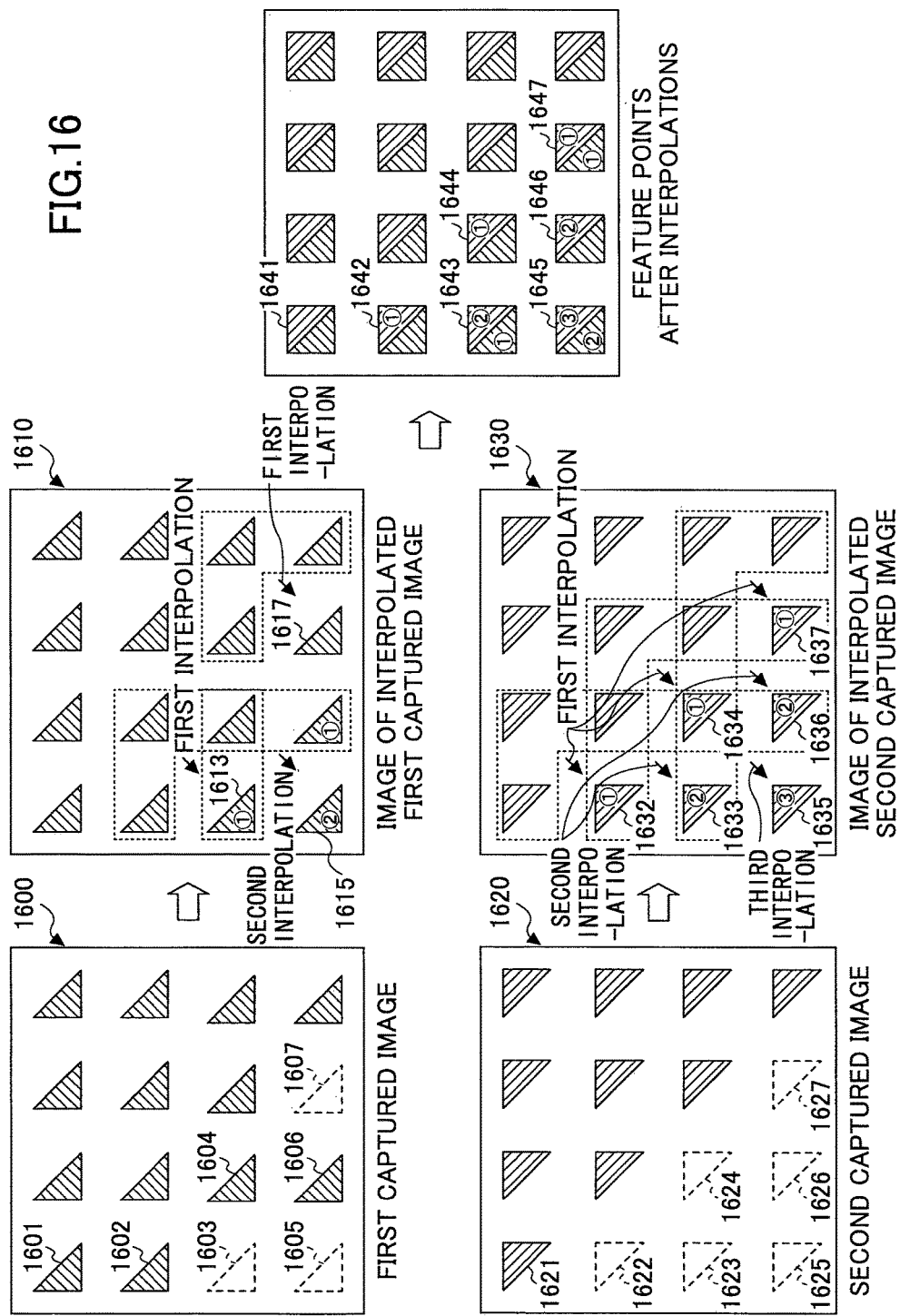
FIG. 16 is another drawing schematically showing a process of interpolating feature points of the correction pattern using a plurality of captured images according to another embodiment.

FIG. 16 schematically shows another method of interpolating the feature point of the correction pattern using a plurality of captured images according to another embodiment. In this embodiment, the pattern extracting device 200 includes not only the functional means of FIG. 2 but also a coordinate correction section that corrects the coordinates of the feature points included in the captured images and/or the coordinates of the feature points calculated by the interpolating section 203. In the following, with reference to FIG. 16, a method of interpolating the feature point of the correction pattern by using two of the captured images is described. Further, in another embodiment, three or more of the captured images may be used.

A first captured image 1600 is a captured image of the correction pattern generated by the image capturing device. A second captured image 1620 is a captured image of the same correction pattern captured from the same position as that in the first captured image 1600 but is captured in different conditions such as different exposure time and different white balance setting.

In another embodiment, as in the embodiment of FIG. 15, the second captured image may be generated by changing the tone of the first captured image by correcting the gamma value. Further, when the interpolation is performed by digitizing the first captured image, the image to be interpolated may be obtained by changing the threshold value for the digitization.

The image 1610 is an image that is generated by interpolating the first captured image 1600. In the embodiment of FIG. 16, the defective parts 1603 and 1607 are interpolated by the first interpolation process which is performed on the first captured image 1600, and the coordinates of the feature points 1613 and 1617 are acquired. Further, by the second interpolation process, the defective part 1605 is interpolated and the coordinates of the feature point 1615 are acquired.

The image 1630 is an image that is generated by interpolating the second captured image 1620. In the embodiment of FIG. 16, the defective parts 1622, 1624, and 1627 are interpolated by the first interpolation process which is performed on the second captured image 1620, and the coordinates of the feature points 1632, 1634 and 1637 are acquired. Further, by the second interpolation process, the defective parts 1623 and 1626 are interpolated and the coordinates of the feature points 1633 and 1636 are acquired. Further, by the third interpolation process, the defective part 1625 is interpolated and the coordinates of the feature point 1635 are acquired.

The coordinate correction section corrects the coordinates of the feature point of the correction pattern by using the coordinates of the feature points of the first captured image, the coordinates of the feature points of the second captured image, the coordinates of the feature point acquired by interpolating the first captured image, and/or the coordinates of the feature point acquired by interpolating the second captured image.

More specifically, if both of the feature points corresponding to each other between two captured images are not defective (missing), the coordinate correction section uses the average value of the two feature points as the correction value. For example, the coordinate correction section calculates the average value of the feature point 1601 of the first captured image 1600 and the feature point 1621 of the second captured image 1620 to acquire the correction value of the feature point 1641.

Further, if only one of the feature points corresponding to each other between two captured images is defective (missing), the coordinate correction section uses the coordinates of the feature point which is not defective as the correction value. For example, the coordinate correction section uses the coordinates of the feature points 1602, 1604, and 1606 of the first captured image as the correction values of the feature points 1642, 1644, and 1646, respectively.

Further, if both of the feature points corresponding to each other between two captured images are defective (missing), the coordinate correction section calculates the correction value by weighted averaging the coordinates of the interpolated feature points.

For example, as for the feature point 1643, the interpolation process is performed on the first captured image 1600 one time, and the interpolation process is performed on the second captured image 1620 two times. In this case, the coordinate correction section may calculate the correction value by multiplying a weighting value ($2/3$) with the coordinates of the feature point 1613 of the first captured image 1600, multiplying a weighting value ($1/3$) with the coordinates of the feature point 1633 of the second captured image 1620, and summing the products.

As for the feature point 1645, the interpolation process is performed on the first captured image 1600 two time, and the interpolation process is performed on the second captured image 1620 three times. In this case, the coordinate correction section may calculate the correction value by multiplying a weighting value ($3/5$) to the coordinates of the feature point 1615 of the first captured image 1600, multiplying a weighting value ($2/5$) to the coordinates of the feature point 1635 of the second captured image 1620, and summing the products. By doing this, it may become possible to make correction by putting a higher weight on the coordinates of the feature point that has been interpolated fewer times so far (i.e., the feature point having a higher reliability).

As for the feature point 1647, the interpolation process is performed on the first captured image 1600 one time, and the interpolation process is performed on the second captured image 1620 one time. In this case, the coordinate correction section may calculate the correction value by multiplying a weighting value ($1/2$) with the coordinates of the feature point 1617 of the first captured image 1600, multiplying a weighting value ($1/2$) with the coordinates of the feature point 1637 of the second captured image 1620, and summing the products.

In this embodiment, the correction value is acquired by weighted averaging the coordinates of the interpolated feature points. However, in another embodiment, the coordinates of the feature point which has been interpolated fewer times may be used as the correction value. Further, in still another embodiment, the coordinates of the feature point may be corrected by using three or more captured images. In this case, as the weighting values to be used in the weighting averaging of the coordinates of the feature points, arbitrary values may be used. For example, when three captured images are used, values "$3/6$", "$2/6$", and "$1/6$" may be used as the weighting values to be used in the weighting averaging of the coordinates of the feature points in the increasing order of the interpolation times. Further, in the descriptions, circular patterns (e.g., black circles) are used. However, the present invention is not limited to the circular pattern described herein. Namely, for example any other appropriate pattern may also be used as the pattern to carry out the present invention.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

The present application is based on and claims the benefit of priority of Japanese Patent Application Nos. 2012-115526 filed May 21, 2012, 2013-045300 filed Mar. 7, 2013, and 2013-052976 filed Mar. 15, 2013, the entire contents of which are hereby incorporated herein by reference.

DESCRIPTION OF THE REFERENCE NUMERALS

200: PATTERN EXTRACTING DEVICE
201: INTERPOLATION CONTROLLING SECTION
202: INTERPOLATION TARGET EXTRACTING SECTION
203: INTERPOLATING SECTION
204: STATUS UPDATING SECTION
205: STORAGE SECTION
206: COORDINATE DATA BUFFER
207: STATUS BUFFER

PRIOR ART DOCUMENTS

[Patent Document 1] Japanese Laid-Open Patent Publication No. 2010-028411

The invention claimed is:

1. A pattern extracting device comprising:
circuitry configured to:
extract a plurality of feature points from a captured image of an image pattern that is projected on to a display;
set a subset of the plurality feature points as near-by feature points, the subset of the plurality of feature points determined as located within a range of a predetermined distance from a feature point that is missing in the captured image, and the feature point that is missing corresponding to a corresponding feature point of the image pattern that is intended to be projected;
interpolate the feature point that is missing in the captured image by using the near-by feature points which are located near the feature point to obtain a corrected image;
correct a distortion in the captured image based on the interpolated feature point; and
display, on the display, the corrected image after correcting the distortion in the captured image.

2. The pattern extracting device according to claim 1, wherein the circuitry is configured to divide the near-by feature points into groups, calculate extrapolation coordinates of the groups, and calculate coordinates of the feature point based on the extrapolation coordinates.

3. The pattern extracting device according to claim 1, wherein the circuitry is configured to:
update status information which indicates a status of all feature points, and
extract the feature point by using the status information.

4. The pattern extracting device according to claim 1, wherein the circuitry is configured to:
calculate a confidence rating of the interpolated feature point.

5. The pattern extracting device according to claim 1, wherein the circuitry is configured to repeatedly perform interpolation on the feature point.

6. The pattern extracting device according to claim 1, wherein the circuitry is configured to calculate coordinates of the feature point by using coordinates of the corresponding feature point that is included in the image pattern to be projected and that corresponds to the feature point, coordinates of feature points that are included in the image pattern to be projected and that are located near the corresponding feature point corresponding to the feature point, and coordinates of the near-by feature points located near the feature point.

7. The pattern extracting device according to claim 1, wherein the circuitry is configured to extract the feature point by using a plurality of captured images of the image pattern.

8. The pattern extracting device according to claim 1, wherein the circuitry is configured to perform interpolation processes on each of a plurality of captured images of the image pattern, and
wherein the circuitry is configured to correct at least one of coordinates of the feature point and coordinates of all feature points included in the captured image by using at least one of the coordinates of all the feature points included in the captured image and coordinates of all the feature points calculated by the circuitry.

9. The pattern extracting device according to claim 1, wherein the circuitry is configured to store, in a memory, a status value of the feature point, and to update the status value when a difference between first coordinates of the feature point calculated in a first interpolation process and second coordinates of the feature point calculated in a second interpolation process is less than or equal to a threshold value.

10. An image projecting device comprising the pattern extracting device according to claim 1.

11. A pattern extracting method executed by a pattern extracting device, the pattern extracting method comprising:
extracting a plurality of feature points from a captured image of an image pattern that is projected on to a display;
setting a subset of the plurality feature points as near-by feature points, the subset of the plurality of feature points determined as located within a range of a predetermined distance from a feature point that is missing in the captured image, and the feature point that is missing corresponding to a corresponding feature point of the image pattern that is intended to be projected;
interpolating the feature point that is missing in the captured image by using the near-by feature points which are located near the feature point to obtain a corrected image;
correcting a distortion in the captured image based on the interpolated feature point; and
display, on the display, the corrected image after correcting the distortion in the captured image.

12. The pattern extracting method according to claim 11, wherein the near-by feature points are divided into groups, extrapolation coordinates of the groups are calculated, and coordinates of the feature point are calculated based on the extrapolation coordinates.

13. The pattern extracting method according to claim 11, further comprising:
updating status information which indicates a status of all feature points,
wherein the feature point is extracted by using the status information.

14. The pattern extracting method according to claim 11, further comprising:
calculating a confidence rating of the interpolated feature point.

15. The pattern extracting method according to claim 11, wherein interpolation is repeatedly performed on the feature point.

16. The pattern extracting method according to claim 11, wherein coordinates of the feature point are calculated by using coordinates of the corresponding feature point that is included in the image pattern to be projected and that corresponds to the feature point, coordinates of feature points that are included in the image pattern to be projected and that are located near the corresponding feature point corresponding to the feature point, and coordinates of the near-by feature points located near the feature point.

17. The pattern extracting method according to claim 11, wherein the feature point is extracted by using a plurality of captured images of the image pattern.

18. The pattern extracting method according to claim 11, wherein said extracting and said interpolating are performed on each of a plurality of captured images of the image pattern, and
wherein the pattern extracting method further includes correcting at least one of coordinates of the feature point and coordinates of all feature points included in the captured image by using at least one of the coordinates of all the feature points included in the captured image and coordinates of all the feature points calculated during said interpolating.

19. The pattern extracting device according to claim 9, wherein the status value is one of a first status value which indicates an unconfirmed status where a respective feature point is not interpolated, a second status value which indicates a confirmed status where the respective feature point has existed since an initial status, and a third status value which indicates a status where the respective feature point is interpolated.

20. A non-transitory computer readable medium including a program causing the pattern extracting device to execute the pattern executing method according to claim 11.

* * * * *